(12) United States Patent
Tomita

(10) Patent No.: US 7,953,702 B2
(45) Date of Patent: May 31, 2011

(54) DOCUMENT ADMINISTRATION APPARATUS, AND RECORDING MEDIUM IN WHICH DOCUMENT ADMINISTRATION PROGRAM IS STORED

(75) Inventor: Atsushi Tomita, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 240 days.

(21) Appl. No.: 11/235,257

(22) Filed: Sep. 27, 2005

(65) Prior Publication Data

US 2006/0212497 A1    Sep. 21, 2006

(30) Foreign Application Priority Data

Mar. 18, 2005    (JP) ................. 2005-080439

(51) Int. Cl.
*G06F 17/00*    (2006.01)
(52) U.S. Cl. .............. 707/622; 715/847; 709/204
(58) Field of Classification Search .......... None
See application file for complete search history.

(56) References Cited

U.S. PATENT DOCUMENTS

| | | | | |
|---|---|---|---|---|
| 5,895,471 | A * | 4/1999 | King et al. | 707/104.1 |
| 6,100,890 | A * | 8/2000 | Bates et al. | 715/826 |
| 6,377,286 | B1 * | 4/2002 | Hochmuth | 715/810 |
| 7,111,037 | B1 * | 9/2006 | Chesley et al. | 709/203 |
| 7,319,993 | B2 * | 1/2008 | Eruhimov | 707/1 |
| 7,567,987 | B2 * | 7/2009 | Shappell et al. | 1/1 |
| 7,721,216 | B2 * | 5/2010 | Zaner et al. | 715/758 |
| 2002/0049749 | A1 * | 4/2002 | Helgeson et al. | 707/3 |
| 2002/0073080 | A1 * | 6/2002 | Lipkin | 707/3 |
| 2002/0122076 | A1 * | 9/2002 | Nakaki | 345/847 |
| 2002/0184310 | A1 * | 12/2002 | Traversat et al. | 709/204 |
| 2003/0038965 | A1 * | 2/2003 | Simpson et al. | 358/1.15 |
| 2003/0078918 | A1 * | 4/2003 | Souvignier et al. | 707/3 |
| 2003/0115069 | A1 * | 6/2003 | Pence et al. | 705/1 |

(Continued)

FOREIGN PATENT DOCUMENTS

JP    11-196206    7/1999

(Continued)

OTHER PUBLICATIONS

Notification of Reasons for Refusal issued in corresponding Japanese Patent Application No. 2005-080439, mailed Apr. 8, 2008, and translation thereof.

(Continued)

*Primary Examiner* — Apu M Mofiz
*Assistant Examiner* — Hung D Le
(74) *Attorney, Agent, or Firm* — Buchanan Ingersoll & Rooney PC

(57) ABSTRACT

A document administration apparatus, includes a sharing request receiving portion configured to receive a request of sharing a document stored in a first box among boxes which are divided storing areas, a box information receiving portion configured to receive box information on one or more second boxes each correlated with each user sharing the document to which the sharing request is made, a shortcut creating portion configured to create a shortcut to all of the second boxes represented by the box information received by the box information receiving portion, the shortcut including link information to the document stored in the first box, and a link portion configured to process an access to the shortcut created by the shortcut creating portion by replacing the access with an access to the document which is a linked destination written in the shortcut.

23 Claims, 12 Drawing Sheets

U.S. PATENT DOCUMENTS

| | | | |
|---|---|---|---|
| 2004/0093331 A1* | 5/2004 | Garner et al. | 707/3 |
| 2005/0204041 A1* | 9/2005 | Blinn et al. | 709/225 |
| 2005/0229106 A1* | 10/2005 | Labarge et al. | 715/745 |
| 2006/0053481 A1* | 3/2006 | Olsen et al. | 726/3 |
| 2006/0155821 A1* | 7/2006 | Pichetti et al. | 709/213 |
| 2006/0277205 A1* | 12/2006 | Song et al. | 707/102 |
| 2007/0038872 A1* | 2/2007 | Bridges et al. | 713/193 |
| 2007/0136433 A1* | 6/2007 | Booton et al. | 709/213 |

FOREIGN PATENT DOCUMENTS

| | | |
|---|---|---|
| JP | 11-139238 | 8/1999 |
| JP | 11-239238 | 8/1999 |
| JP | 20000766237 A * | 3/2000 |
| JP | 2001-069293 | 3/2001 |
| JP | 2002259010 | 9/2002 |
| JP | 2002-334088 | 11/2002 |
| JP | 2003173329 A | 6/2003 |
| JP | 2003326776 A | 11/2003 |
| JP | 2004288024 A | 10/2004 |
| JP | 2005-032109 | 2/2005 |

OTHER PUBLICATIONS

Notification of Reasons for Refusal dated Jan. 20, 2009 for Japanese Patent Application No. 2005-80439.

* cited by examiner

Shortcut administration register

| Parent box No. | Document No. | Patent notification destination | Box No. | Shortcut No. | Creation date and time | User name | Password | Notification destination | Functional limitation | | Access No. of times |
|---|---|---|---|---|---|---|---|---|---|---|---|
| | | | | | | | | | Print | Transmission | |
| 123 | 1001 | yama@abc.com | 1344 | 1 | 2004/4/3 10:34 | | | au@abc.com | OK | NG | 0 |
| 123 | 1001 | yama@abc.com | 1506 | 2 | 2004/4/3 10:34 | | | bd@abc.com | NG | OK | 0 |
| 123 | 1001 | yama@abc.com | 2102 | 3 | 2004/4/3 10:34 | | | km@abc.com | OK | OK | 0 |
| 2255 | 29388 | smith@abc.com | 1332 | 4 | 2004/4/4 14:08 | yamada | yamada | tt@abc.com | OK | NG | 0 |
| 2255 | 29388 | smith@abc.com | 1332 | 4 | 2004/4/4 14:08 | ito | ito | si@abc.com | OK | NG | 0 |
| .. | .. | .. | .. | .. | .. | | | .. | | | |

FIG.5

Shortcut access log

| Accessed date and time | Shortcut Number | User name |
|---|---|---|
| 2004/4/4 10:34 | 1 | |
| 2004/4/4 13:34 | 232 | yamada |
| 2004/4/5 13:34 | 5 | |
| 2004/4/8 09:08 | 342 | ito |
| 2004/4/8 11:28 | 33 | |
| ⋮ | ⋮ | |
| | | |

FIG.11

DOCUMENT ADMINISTRATION APPARATUS, AND RECORDING MEDIUM IN WHICH DOCUMENT ADMINISTRATION PROGRAM IS STORED

This application claims priority under 35 U.S.C. §119 to Japanese Patent Application No. 2005-80439 filed on Mar. 18, 2005, the entire disclosure of which is incorporated herein by reference in its entireties.

BACKGROUND OF THE INVENTION

1. Field of the Invention

The present invention relates to a document administration apparatus having a box function capable of storing documents (including image data) in a divided manner and a recording medium in which document administration program is stored.

2. Description of the Related Art

The following description sets forth the inventor's knowledge of related art and problems therein and should not be construed as an admission of knowledge in the prior art.

A recently available image forming apparatus has a function of once storing electronic data in a storing apparatus such as a hard disk and outputting the electronic data at timing desired by a user as well as a function of immediately printing received print data or facsimile data.

Furthermore, also known is an image forming apparatus in which the aforementioned electronic data is stored in one of subdivided storing areas each called "box" every user or group.

As for the technique directed to such a box, Japanese Unexamined Laid-open Patent Publication No. JP 11-196206-A discloses a facsimile apparatus in which received facsimile information is discriminated and stored into destination exclusive boxes divided every destination based on the destination recognized by the information.

Furthermore, Japanese Unexamined Laid-open Patent Publication No. JP 11-239238-A discloses a facsimile apparatus capable of storing a confidential document in an individual box of a confidential destination user when the confidential document is received, registering the storing destination of this confidential document in a web server itself, then notifying the confidential destination user of the receiving of the confidential document via an email, and informing the user of the linked destination of the confidential document when the confidential destination user accesses the facsimile apparatus via a personal computer and inputs his/her ID and password so that the user can browse the confidential document.

Moreover, also known is an image forming apparatus having such a box technique equipped with the so-called "private box" only accessible by a specific user or group with a password and the like. Considering user-friendliness, another image forming apparatus is equipped with both such a private box and the so-called "public box" with no access limitation.

However, in cases where a box function of an image forming apparatus as mentioned above is used, there is a case in which a document is shared by specific users while limiting general public access. In such a case, storing the document in the public box allows the general public access. To the contrary, storing the document in the private box limits the specific users who are allowed to access.

Although it is possible to use the private box as a box for a certain group, the group member sharing a document stored in the private box may change depending the circumstances. Therefore, it is required to create a private box in each case, or to change the password of the private box, resulting in deteriorated user-friendliness.

Alternatively, it is possible to store a copy of a document to be shared by users in each user's private box so that each user can share the document. However, this requires a large storing area.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a document administration apparatus capable of sharing a document by specific plural users without deteriorating the usability and requiring a larger storing area at the time of using the box function equipped to the apparatus.

Among other potential advantages, some embodiments can provide a recording medium in which document administration program for executing document administration processing to be used in a document administration apparatus by a computer is stored.

According to a first aspect of the preferred embodiment of the present invention, a document administration apparatus, comprises a sharing request receiving portion configured to receive a request of sharing a document stored in a first box among boxes which are divided storing areas, a box information receiving portion configured to receive box information on one or more second boxes each correlated with each user sharing the document to which the sharing request is made, a shortcut creating portion configured to create a shortcut in all of the second boxes represented by the box information received by the box information receiving portion, the shortcut including link information to the document stored in the first box, and a link portion configured to process an access to the shortcut created by the shortcut creating portion by replacing the access with an access to the document which is a linked destination written in the shortcut.

According to a second aspect of the preferred embodiment of the present invention, a document administration apparatus, comprises a sharing request receiving portion configured to receive a request of sharing a document stored in a first box among boxes which are divided storing areas, a box information receiving portion configured to receive box information on a second box used to share a document to which the sharing request is made, a sharing user information receiving portion configured to receive identification information of one or more users sharing the document stored in the first box, a shortcut creating portion configured to create a shortcut to the second box represented by the box information received by the box information receiving portion, the shortcut including link information to the document stored in the first box and the user identification information, a user authentication portion configured to judge whether an access to the shortcut is allowed by discriminating whether user identification information inputted coincides with any user identification information written in the shortcut when the user accesses the shortcut created by the shortcut creating portion, and a link portion configured to process an access to the shortcut by replacing the access with an access to the document which is a linked destination written in the shortcut only when the access is allowed by the user authentication portion.

According to a third aspect of the preferred embodiment of the present invention, a recording medium in which document administration program is stored, wherein the document administration program makes a computer execute the steps of: receiving a request of sharing a document stored in a first box among boxes which are divided storing areas; receiving box information on one or more second boxes each correlated with each user sharing the document to which the sharing request is made; creating a shortcut in all of the second boxes represented by the box information, the shortcut including link information to the document stored in the first box; and processing an access to the created shortcut by replacing the access with an access to the document which is a linked destination written in the shortcut.

According to a fourth aspect of the preferred embodiment of the present invention, a recording medium in which document administration program is stored, wherein the document administration program makes a computer execute the steps of: receiving a request of sharing a document stored in a first box among boxes which are divided storing areas; receiving box information on one or more second boxes used to share a document to which the sharing request is made; receiving identification information of one or more users sharing the document stored in the first box; creating a shortcut to the second boxes represented by the box information received, the shortcut including link information to the document stored in the first box and the user identification information; judging whether an access to the shortcut is allowed by discriminating whether user identification information inputted coincides with any user identification information written in the shortcut when the user accesses the shortcut created; and processing an access to the shortcut by replacing the access with an access to the document which is a linked destination written in the shortcut only when the access is allowed at the judging step.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 5 is a table showing an example of a shortcut administration register;

FIG. 11 is a table showing an example of an access log to shortcuts;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
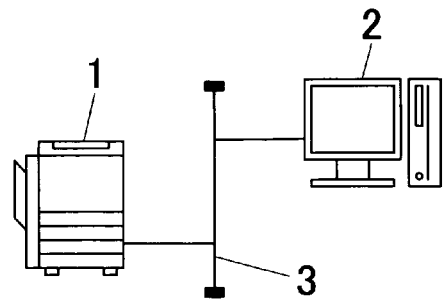
FIG. 1 is a schematic view showing a structure of an image forming system using an image forming apparatus to which a document administration apparatus according to an embodiment of the present invention is applied.

FIG. 1 is an explanatory view showing the structure of the system including an image forming apparatus to which a document administration apparatus according to an embodiment of the present invention is applied.

This system includes an image forming apparatus 1 and a terminal apparatus 2. The image forming apparatus 1 and the terminal apparatus 2 are connected with each other via the network 3.

The network 3 can be any one of networks including a network using dedicated lines such as a LAN (Local Area Network), a network using a general line, and a wireless network.

The image forming apparatus 1 is an apparatus for forming a scanned original image or an image created from the print data transmitted from the terminal apparatus 2 on a paper. The scanned original image can be transmitted to the terminal apparatus 2 and/or another image forming apparatus via the network 3.

The terminal apparatus 2 is a general computer provided with a CPU, a RAM, a fixed storage, a monitor, a keyboard, a mouse, etc. The terminal apparatus 2 creates print data based on user instructions and transmits the created print data to the image forming apparatus 1.

Figure 2:
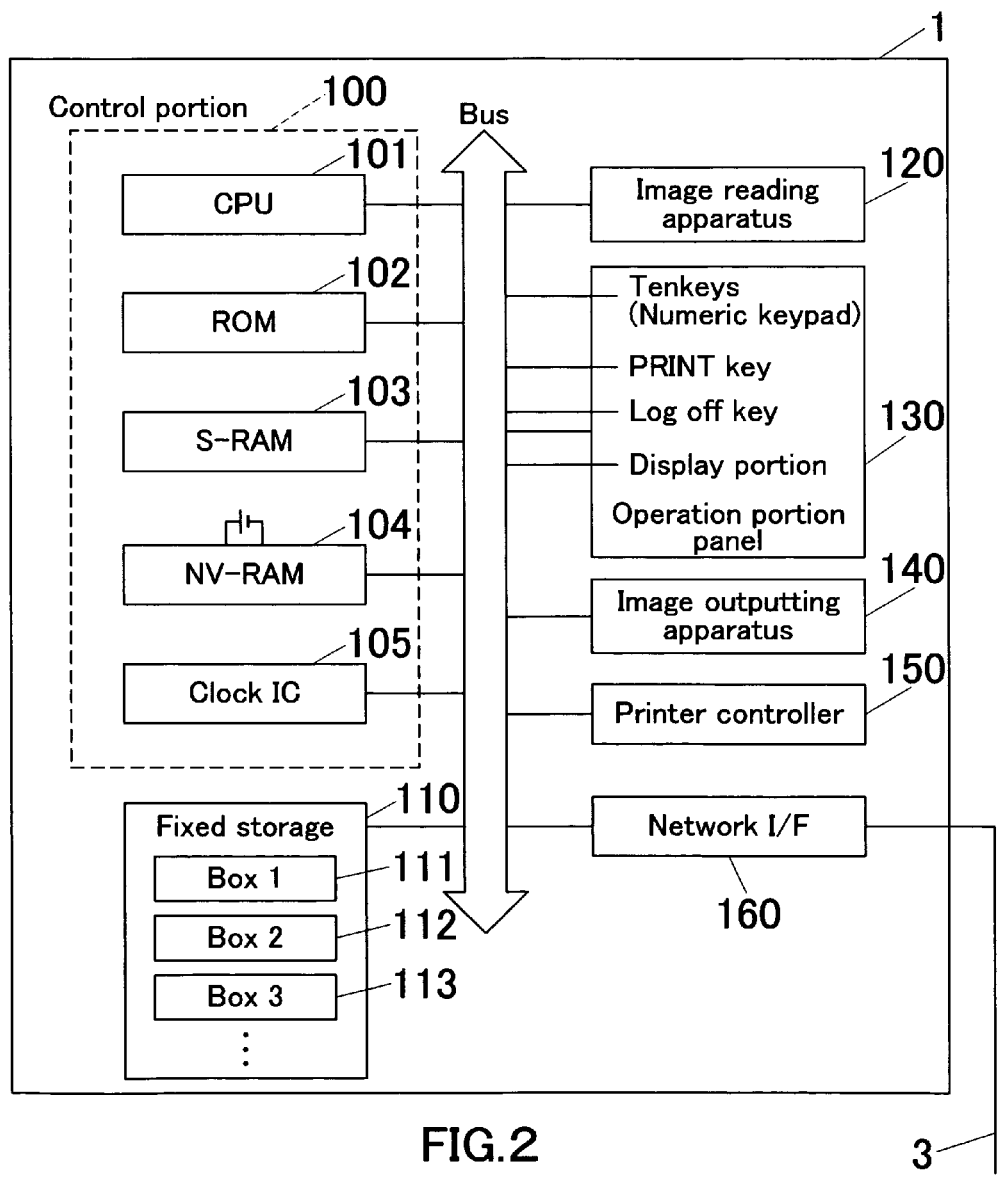
FIG. 2 is a block diagram showing an internal structure of the image forming apparatus to be used in the image forming system shown in FIG. 1.

FIG. 2 shows the internal structure of the image forming apparatus 1.

Connected to the CPU 101 of the image forming apparatus 1 via a bus are a ROM 102 in which control program including document administration program is stored, a working S-RAM (Static Random Access Memory) 103, a battery-backuped NV-RAM (nonvolatile memory) for storing various settings regarding image formation, and a clock IC 105 having a calendar function. They constitute a control portion 100.

Furthermore, connected to the control portion 100 via the bus are an image reading apparatus 120 for reading an original document, an operation panel 130 equipped with keys for inputting various inputs and a displaying portion, a network interface (hereinafter, "network I/F") 160 for exchanging various information among external apparatuses including the terminal apparatus 2 connected via the network 3, a printer controller 150 for creating a copy image from the print data received via the network I/F 160, and an image outputting apparatus 140 for forming the copy image on a paper.

Furthermore, a fixed storage 110 is connected to the control portion 100 via the bus. Examples of the fixed storage 110 include a hard disk.

The fixed storage 110 includes divided storing areas, or boxes 111, 112, 113 . . . , and can store an original image read by the image reading apparatus 120, a copy image created from the print data transmitted from the terminal apparatus 2, and various information in the boxes as documents. Documents stored in boxes can be printed out, or transmitted to the terminal apparatus 2 via the network I/F 160.

The aforementioned boxes 111, 112, 113 . . . include two types of boxes, i.e., a "public box" with no access limitation to the stored documents and a "private box" with an access limitation to the stored document allowing an access by a specific user or user group. The private box is structured so as to limit the access by passwords. Allotting the passwords to a specific user or group enables only the user or group to access the documents stored in the box.

In the fixed storage 110, both the public box and the private box can include one or more boxes, respectively. Each box can be identified uniquely by the box number. Alternatively, each box can be identified by a name so that a user can easily identify the box.

Both the public box and the private box can store one or more documents in each box. A unique document identification number common to all boxes will be allotted to a document to be stored in any one of boxes. Like the box, each document can be identified by a name so that a user can easily identify the document.

The boxes 111, 112, 113, . . . are created by the operation at the operation panel 130. At this time, a box number, a box name, a box type (public box or private box) are inputted at this operation panel 130 and stored in the fixed storage 110. In the case of the private box, a password is further inputted to be stored in the fixed storage. The box can be deleted by the operation at the operation panel 130.

Hereinafter, the processing flow in the image forming apparatus 1 will be explained.

[1] Entire Processing Flow of the Image Forming Apparatus

Figure 3:
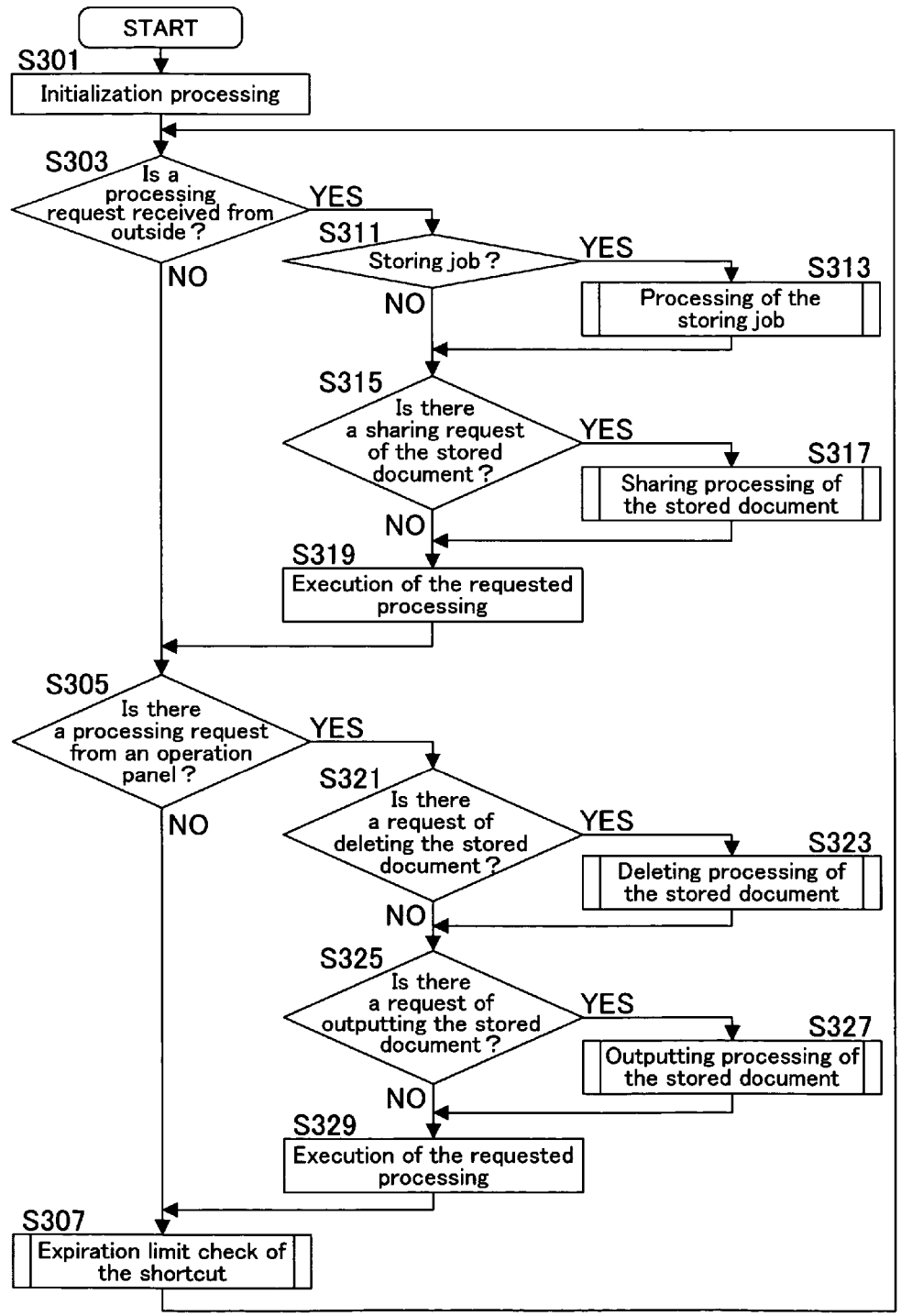
FIG. 3 is a flowchart showing the entire processing flow to be executed by the CPU of the image forming apparatus shown in FIG. 2.

The entire processing flow of the image forming apparatus will be explained with reference to the flowchart shown in FIG. 3. This processing is performed by executing the program stored in the ROM 102.

At the CPU 101, processing is initiated upon the application of power. Initially, initialization processing such as a memory clear and a standard mode setting is executed (at Step (hereinafter simply referred to as "S") 301).

After the completion of the initialization processing, it is discriminated whether there is any processing request (e.g., document print processing request, or various setting processing) from an external apparatus such as the terminal apparatus 2 via the network 3 (at S303). If there is no request (NO at S303), the routine proceeds to S305.

In cases where there is any processing request from an external apparatus (YES at S303), it is discriminated whether it is a storing job for storing a document in a box (S311), and if it is the storing job (YES at S311), the document storing processing is executed (S313). The document storing job will be detailed later.

If the job requested by an external job is not the storing job (NO at S311), it is discriminated whether the requested processing is sharing processing of a document already stored in the box at S315. If is it discriminate that it is sharing processing of a document already stored in the box (YES at S315), the sharing processing of the stored document will be executed (S317). The sharing processing of a stored document will be detailed later.

If the processing requested by the external apparatus is not any one of them (NO at S315), the requested processing is executed (S319). Examples of another processing include document print processing, setting change processing for changing various settings stored in the NV-RAM 104.

When all of the processing requested by the external apparatus is completed, the routine proceeds to S305.

At S305, it is discriminated whether there is any user's processing request (e.g., scanning of an original document and copying processing, various setting processing) generated by the operations of key switches on the operation panel 130 of the image forming apparatus 1 and/or on the display portion. If there is no request (NO at S305), the routine proceeds to S307.

If there is any processing request from a user (YES at S305), it is discriminated whether it is a deletion request of a stored document at S321. If the request is a deletion request (YES at S321), the deletion processing of the stored document is executed (S323). The deletion processing of the stored document will be detailed later.

If the processing required by the user is not a deletion request (NO at S321), it is discriminated whether the request is an output request of a stored document (S325). If it is an output request of a stored document (YES at S325), the output processing of the stored document is executed (S327). The output processing of the stored document will be detailed later.

If the processing requested by the user is none of the above (NO at S325), the requested processing is executed (S329). Examples of another processing include document scanning and copying processing, setting change processing for changing various settings stored in the NV-RAM 104.

After the completion of all of the processing requested by a user via the operation panel 130, the routine proceeds to S307.

At S307, it is discriminated whether the shortcut in the box has been expired. The checking of the shortcut expiration day will be detailed later.

Thereafter, the routine returns to S303 to repeat the aforementioned processing.

[2] Document Storing Processing

Next, S303 shown in FIG. 3, i.e., document storing processing (storing job processing), in the case of creating the shortcut in a private box and creating the shortcut in a public box will be explained, separately.

In the case of creating a shortcut in the private box, a shortcut is created in each of the private boxes of sharing users. For example, in cases where a document is shared by three users, a shortcut is created in each of three private boxes On the other hand, in the case of creating a shortcut in the public box, single shortcut is created to the public box, and all of the identification information of users sharing a document is written in the shortcut.

[2-1] In the Case of Creating a Shortcut in a Private Box

Figure 4:
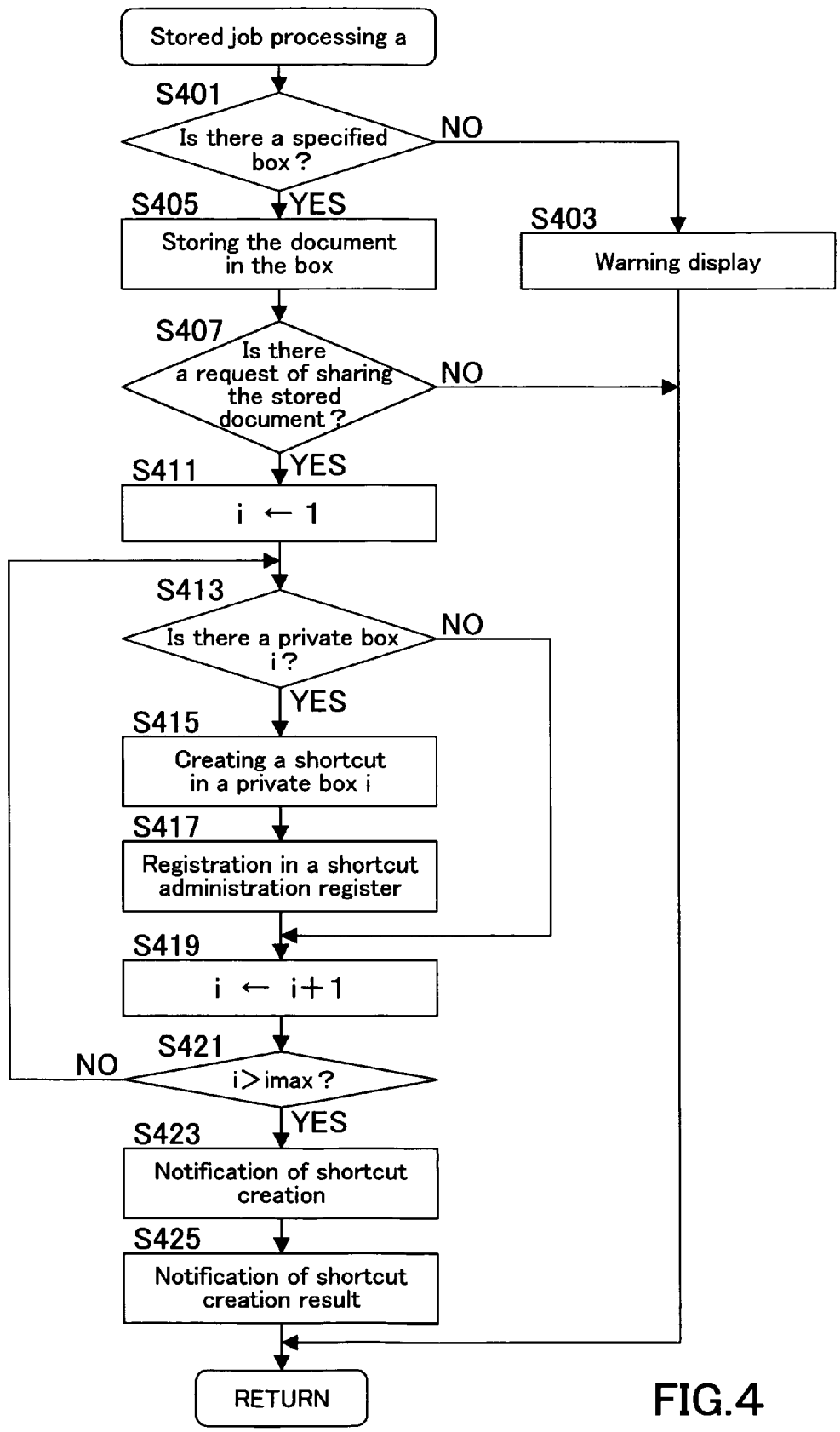
FIG. 4 is a flowchart showing contents of storing job processing (in the case of creating a shortcut in a private box) shown in the flowchart shown in FIG. 3.

Initially, document storing processing in the case of creating a shortcut in a private box will be detailed based on the flowchart shown in FIG. 4.

In a storing job, in the same manner as in a normal print job in which a document is transmitted from the terminal apparatus 2 to the image forming apparatus 1 and a copy image is formed on a paper, print data is transmitted from the terminal apparatus 2 to the image forming apparatus 1. However, in the case of the storing job, what it is an accumulation job is written in the print data. At this time, the box number of the box in which the document is to be stored is simultaneously specified.

For example, by using PJL (Print Job Language) which is normal language for controlling a print job, what it is an accumulation job, e.g., "@PJL SET STOREINBOX=ON," can be written in the print data, and the box number of the box in which the document is to be stored, e.g., "@PJL SET BOXTOSTORE=123," can be specified.

When the CPU 101 receives a storing job from an external apparatus such as the terminal apparatus 2 via the network I/F 160, it is initially confirmed whether the specified box exists (S401). If no specified box exists (NO at S401), a warning is displayed on the displaying apparatus such as a CRT of the terminal apparatus 2, and this processing is terminated.

If the specified box exists (YES at S401), the image data created from the print data is stored as a stored document in the specified box (S405)

Next, it is discriminated whether sharing of the stored document is specified (S407). If it is not specified (NO at S407), the processing is terminated.

In specifying the sharing of the document to be stored, PJL is written in the print data by the number of private boxes of users sharing the document in the format of "box number, destination" ("destination" is a destination to which various notifications on shortcuts are to be made), e.g., [@PJL SET BOXTOSHARE1="1344, au@abc.com"], [PJL SET BOXTOSHARE2="1506, bd@abc.com"].

The method of specifying a private box in which a shortcut is to be created can be a method in which a user name is specified from the terminal apparatus 2 and a box number is specified from the relationship between the user name previously stored in the NV-RAM 104 of the image forming apparatus 1 and the box number of the private box, as well as a method of directly specifying the box number from the terminal apparatus.

In cases where sharing of a stored document is specified (YES at S407), the following processing is executed by the number of boxes to which sharing is specified.

That is, it is discriminated whether there exists a box i to which sharing is specified (S413). If there is no box i (NO at S413), the processing of creating a shortcut in the box i will be skipped, the routine proceeds to S419. If there exists a box i (YES at S413), a shortcut to a document stored in the box i is created (S415).

Then, the created shortcut is registered in the shortcut administration register (S417).

The shortcut administration register also records the following information.

(1) Box number of the box storing the document linked by the shortcut
(2) Document number of the stored document
(3) Destination addresses to which various notifications regarding the stored document will be made
(4) Box number of the box to which the shortcut was created
(5) Shortcut number for uniquely identifying the shortcut over the entire boxes
(6) Creation data and time of the shortcut
(7) User name to whom an access to the document was allowed via the shortcut and the password
(8) Destination addresses to which various notifications regarding the shortcut will be made
(9) Functions available to each shortcut (function restriction)
(10) Access number of times to the shortcut An example of the shortcut administration register is shown in FIG. 5. As for "(9) functions available to each shortcut (function restriction)" mentioned above, the detail explanation will be made later.

In cases where a shortcut is created in the private box, the aforementioned "(7) User name to whom an access to the document was allowed via the shortcut and the password" is remained blank, and is not used (this will be used only when a shortcut is created to a public box). The initial value of the aforementioned "(10) Access number of times to the shortcut" is set to "0." As for the "(8) Destination addresses to which various notifications regarding the shortcut will be made," in the same manner as mentioned above, the destination address can be specified by PJL in the print data, for example, [@PJL SET BOX_ADDRTONOTIFY="yama@abc.com"].

After the completion of creation of shortcuts to all of the private boxes (YES at S421), the completion of shortcut creation is notified to the destination addresses linked by the shortcut registered in the shortcut administration register (S423). This notification enables the users of the private box to which the shortcut was created to recognize that the document is shared by the users. Examples of notification include the document name of the stored document.

Finally, the shortcut creation result is notified to specified destinations specified as destination addresses on the stored document (S425). This notification enables the user requesting the sharing of the document to recognize the completion of the sharing.

Any notification can be made by, for example, an E-mail portion or any other portion.

[2-2] In Cases where a Shortcut is Created in Public Box

Figure 6:
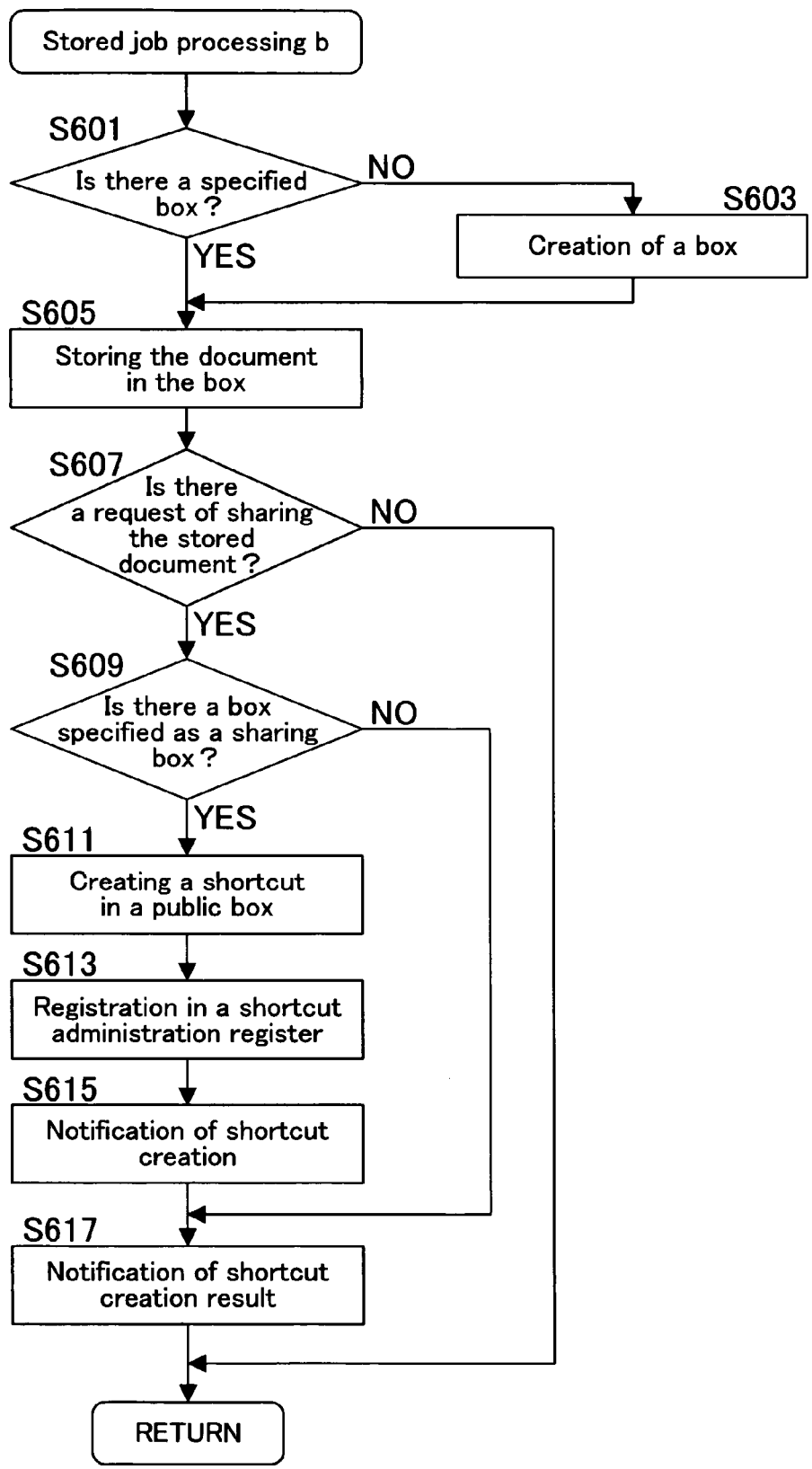
FIG. 6 is a flowchart showing storing job processing (in the case of creating a shortcut in a public box) shown in the flowchart shown in FIG. 3.

Next, the processing of storing a document in the case of creating a shortcut in a public box will be explained with reference to the flowchart shown in FIG. 6.

When the CPU 101 receives a storing job from an external apparatus such as the terminal apparatus 2, it is initially discriminated whether there exists a specified box (S601). If no specified box exists (NO at S601), the public box corresponding to the specified box number is automatically created (S603), and the routine proceeds to S605. The box name is set to the same as the box number. If the specified box exists (YES at S601), the routine proceeds to S605 as it is.

Then, the image data created from the print data is stored in the specified box as a stored document (S605). Thereafter, it is discriminated whether the sharing of the stored document is specified (S607). If the sharing is not specified (NO at S607), this processing is terminated. If the sharing is specified (YES at S607), the routine proceeds to S609.

In specifying the sharing of the document to be stored, PJL is written in the print data by the number of users sharing the document or the number of groups in the format of "box number, user name, password, destination address" ("destination address" is a destination address to which various notifications on shortcuts are to be made, which will be explained later), e.g., [@PJL SET BOXTOSHARE1="1332, yamada, yamada,tt@abc.com"], [PJL SET BOXTOSHARE2="1332, ito, ito, si@abc.com"].

Next, it is discriminated whether there exists a public box specified to be shared (S609). If no public box specified to be shared exits (NO at S609), the routine proceeds to S617.

If there exists a public box specified to be shared (YES at S609), a shortcut to the document stored in the public box is created (S601). This shortcut created in the public box includes the box number of the box in which the linked original document is stored and the document number, and further includes the user name of all of the users or groups specified to be shared and the passwords.

Thereafter, the created shortcut is registered in the shortcut administration register (S613).

This shortcut administration register is the same as that in the case of creating a shortcut in the private box. However, in the case of creating the shortcut in the public box, as shown in lines 4-5 shown in FIG. 5, all of the specified user names and the password are listed in the user name column and the password column.

Then, the completion of creating the shortcut is notified to a destination regarding the shortcut registered in the shortcut administration register (S615). In cases where a shortcut is created in the public box, the completion of creating the shortcut is notified to all of users or groups specified to be shared. This notification enables all of the users or groups specified to be shared to recognize the fact that the document is shared.

Lastly, the shortcut creation result is notified to destinations specified as destination addresses regarding the stored document (S617). This notification enables the user requesting the sharing of the document to recognize the completion of the sharing.

Any notification can be made by, for example, an E-mail portion or any other portion.

[3] Sharing Processing of the Stored Document

Next, S317 shown in FIG. 3, i.e., stored document sharing processing, in the case of creating the shortcut in a private box and creating the shortcut in a public box will be explained, separately.

Figure 7:
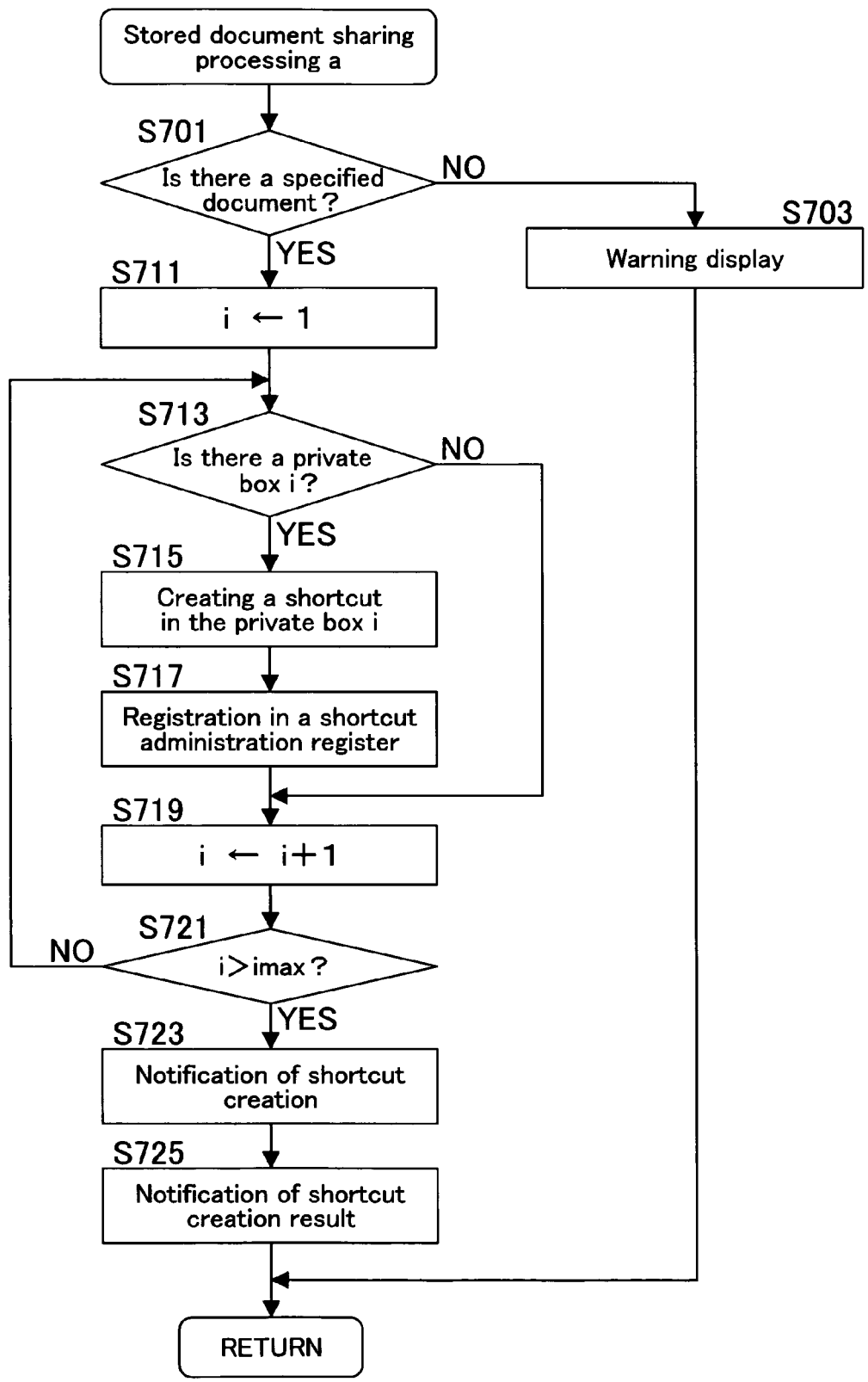
FIG. 7 is a flowchart showing stored document sharing processing (in the case of creating a shortcut in a private box) shown in the flowchart shown in FIG. 3.

[3-1] Processing for Sharing a Stored Document by Creating a Ahortcut in A Private Box First, processing for sharing a document in the case of creating a shortcut in a private box will be detailed with reference to the flowchart shown in FIG. 7.

The terminal apparatus 2 obtains the list of private boxes and the list of documents stored in specified private boxes (hereinafter referred to as "stored document list") from the image forming apparatus 1, and displays them on the displaying apparatus such as a CRT. A user operating the terminal apparatus 2 selects a document to be shared from the stored document list, and selects one or more of private boxes in which a shortcut is to be created from the private box list.

The terminal apparatus 2 transmits print data including the following PJL to the image forming apparatus 1 based on the aforementioned user operation.

%-12345X@PJL
@PJL SET SHAREDOCUMENT=ON
@PJL SET DOCUMENTTOSHARE="123,1001"
@PJL SET BOXTOSHARE1="1344,au@abc.com"
@PJL SET BOXTOSHARE2="1506,bd@abc.com"
@PJL SET BOXTOSHARE3="1506,bd@abc.com"
%-12345X

[@PJL SET SHAREDOCUMENT=ON] specifies the sharing of the stored document. [@PJL SET DOCUMENTTOSHARE="123,1001"] specifies the stored document sharing in the form of ["box number, document number"]. [@PJL SET BOXTOSHAREx= . . . ](x=1,2,3) specifies the private box in which the aforementioned shortcut is to created and the destination addresses.

Receiving the print data, the CPU 101 of the image forming apparatus 1 discriminates whether there exists the document specified by the document number in the box of the specified box number (S701). If no specified document exits (NO at S701), the CPU makes a displaying device, such as a CRT, of the terminal apparatus 2 display the result (S703), and this processing is terminated.

If there exits a specified document (YES at S701), a shortcut to the document is created in all of the private boxes specified to be shared.

Steps 711-725, which are processing for creating this shortcut and processing for notifying to specified destinations, are the same as Steps 411-425, and therefore the explanation will be omitted.

Figure 8:
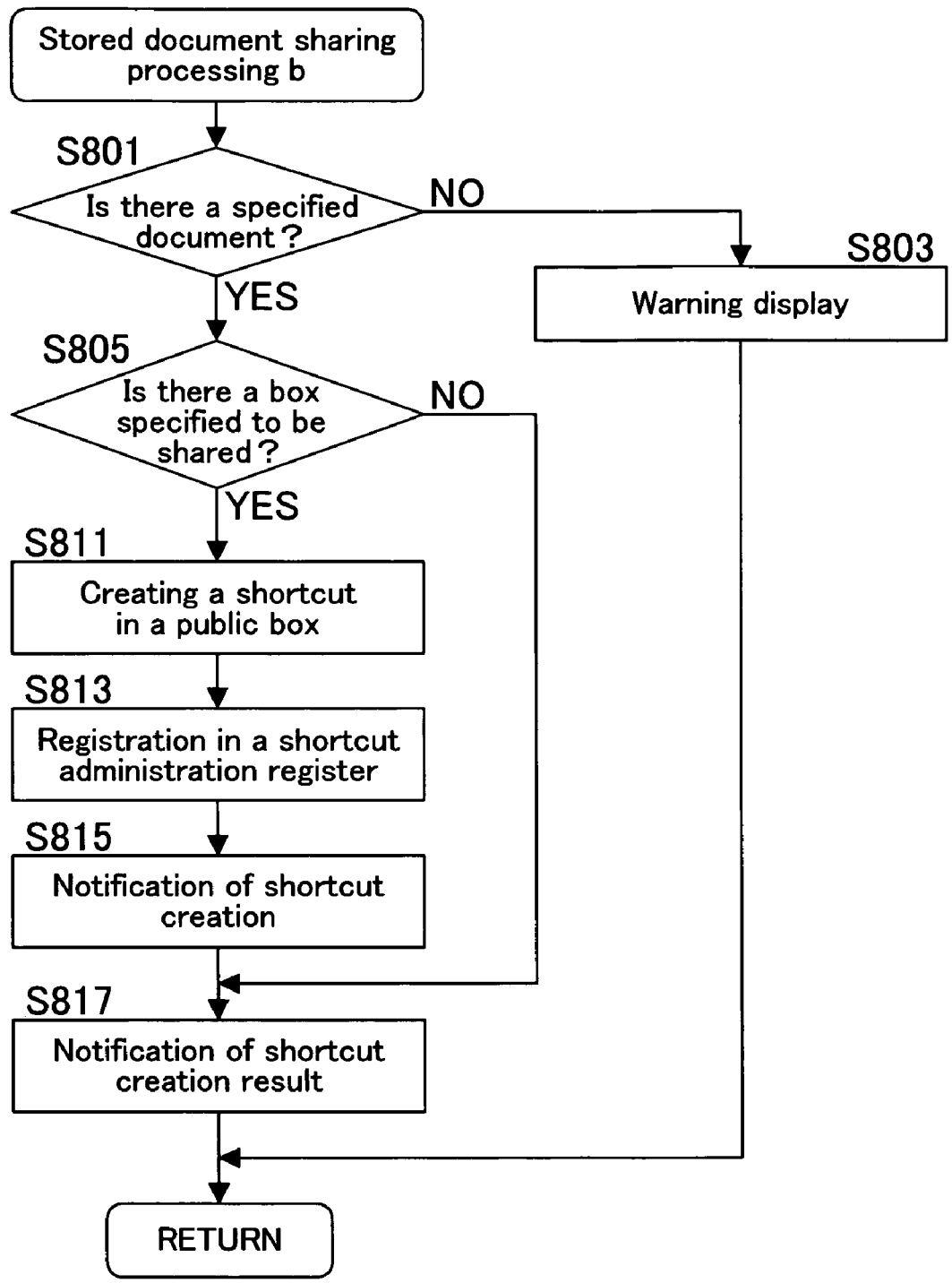
FIG. 8 is a flowchart showing stored document sharing processing (in the case of creating a shortcut in a public box) shown in the flowchart shown in FIG. 3.

[3-2] Processing for Sharing a Stored Document by Creating a Shortcut in a Public Box Next, processing for storing a document in the case of creating a shortcut in a public box will be detailed with reference to the flowchart shown in FIG. 8.

The terminal apparatus 2 obtains the list of all of boxes and that of all of stored documents from the image forming apparatus 1, and displays the lists on the displaying device, such as a CRT, of the terminal apparatus 2.

A user operating the terminal apparatus 2 selects one document to be shared from the stored documents, and specified one or more pairs of a user name and a password of users allowed to access the document.

The terminal apparatus 2 transmits print data including the following PJL to the image forming apparatus 1 based on the aforementioned user operation.

%-12345X@PJL
@PJL SET SHAREDOCUMENT=ON
@PJL SET DOCUMENTOSHARE="123,1001"
@PJL SET BOXTOSHARE1="1332, yamada, yamada, tt@abc.com"
@PJL SET BOXTOSHARE2="1332, ito, ito, si@abc.com"
%-12345X

[@PJL SET SHAREDOCUMENT=ON] specifies the sharing of the stored document. [@PJL SET DOCUMENTTOSHARE="123,1001"] specifies the stored document sharing in the form of ["box number, document number"]. [@PJL SET BOXTOSHAREx=. . . ](x=1,2) specifies the user name and password of a user allowed to access a public box in which the aforementioned shortcut is created and the destination addresses.

Receiving the print data, the image forming apparatus 1 discriminates whether there exists a document specified by the document number in the box of the specified box number (S801). If no specified document exits (NO at S801), the CPU makes a displaying device, such as a CRT, of the terminal apparatus 2 display the warning result (S803), and this processing is terminated.

If there exits a specified document (YES at S801), a shortcut to the document is created in the public box specified to be shared. Steps 805-817, which are processing for creating this shortcut and processing for notifying to specified destinations, are the same as Steps 609-617, and therefore the explanation will be omitted.

[4] Processing for Deleting Stored Documents

Figure 9:
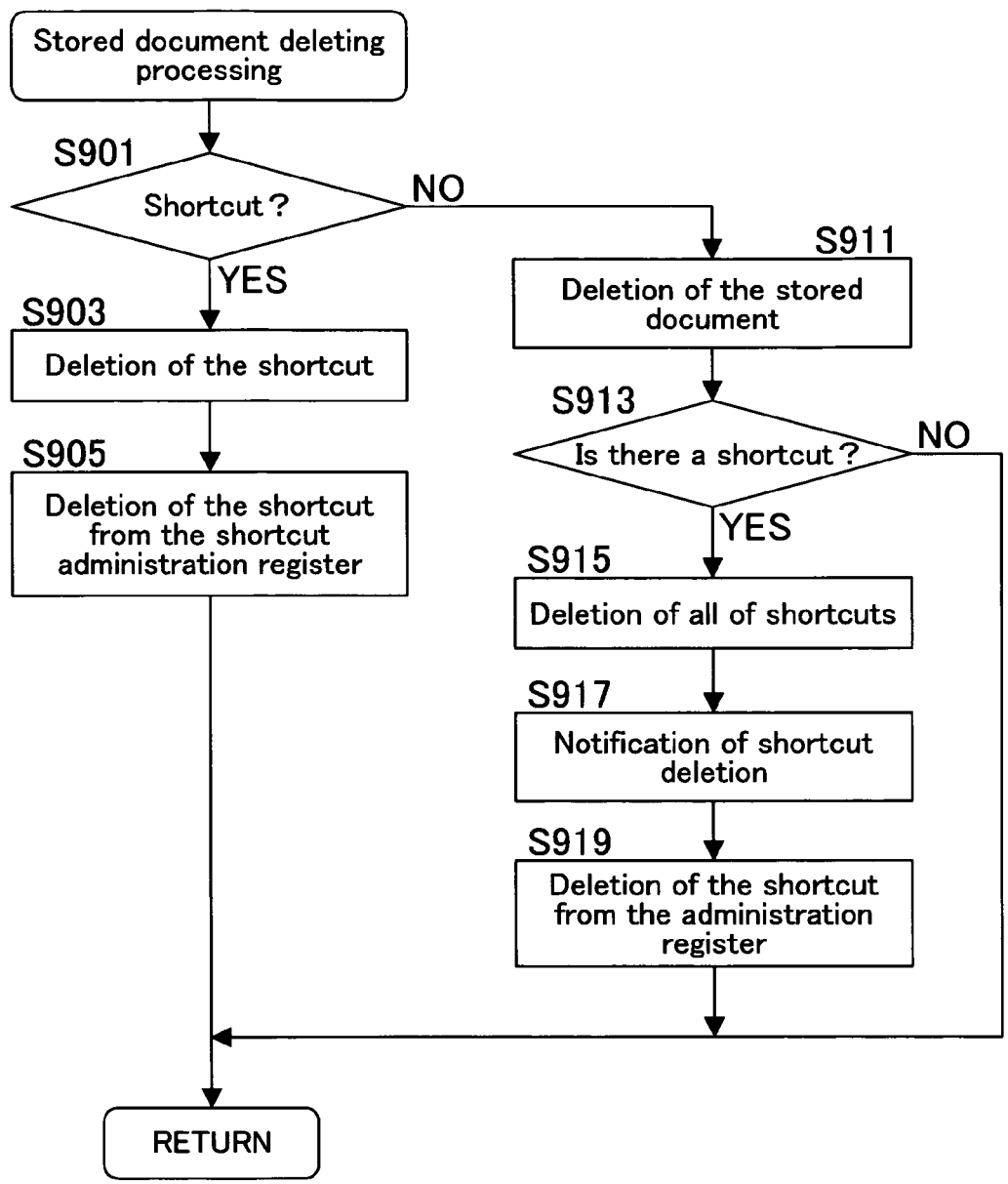
FIG. 9 is a flowchart showing stored document deleting processing shown in the flowchart shown in FIG. 3.

Next, S323 shown in FIG. 3, i.e., processing for deleting stored document, will be detailed with reference to the flowchart shown in FIG. 9.

In the case of deleting a stored document, a user specifies a stored document to be deleted through the operation of the operation panel 130. The CPU 101 discriminates whether the specified stored document is a shortcut (S901). If the specified stored document is a shortcut (YES at S901), the specified shortcut is deleted (S903), and the information on the shortcut specified by the shortcut administration register is deleted from the shortcut administration register (S905). In cases where the specified shortcut is a shortcut created in a public box, all of the information on the users specified to share the document are deleted.

To the contrary, in cases where the specified document is not a shortcut, or the specified document is an original document (NO at S901), the specified document is initially deleted (S911).

Next, it is discriminated whether there exists a shortcut to a specified document by referring the shortcut administration register (S913). If no shortcut to the specified document exists (NO at S913), this processing is terminated. If the shortcut to the specified document exists (YES at S913), all of shortcuts to the document are deleted (S915). As a result, unnecessary shortcuts can be prevented from being remained.

Then, the deletion of the shortcut is notified to destinations related to the shortcut registered in the shortcut administration document (S917). In cases where the shortcut to the public box is deleted, the deletion of the shortcut is notified to the destination of all of the users or groups specified to be shared. This enables the sharing users to recognize the deletion of the shortcut.

Lastly, all of the information on the shortcut is deleted from the shortcut administration register (S919). In cases where the deleted shortcut is a shortcut to the public box, all of the information of the users specified to be shared is deleted from the shortcut administration register.

[5] Output Processing of Stored Documents

Next, S327 shown in FIG. 3, i.e., stored document outputting processing, in the case of outputting a stored document via the shortcut in the private box and outputting the stored document via the shortcut in the public box will be explained, separately.

Outputting a stored document denotes outputting an image of a stored document on a paper, or transmitting the stored document to an external apparatus such as the terminal apparatus 2 via the network 3.

Figure 10:
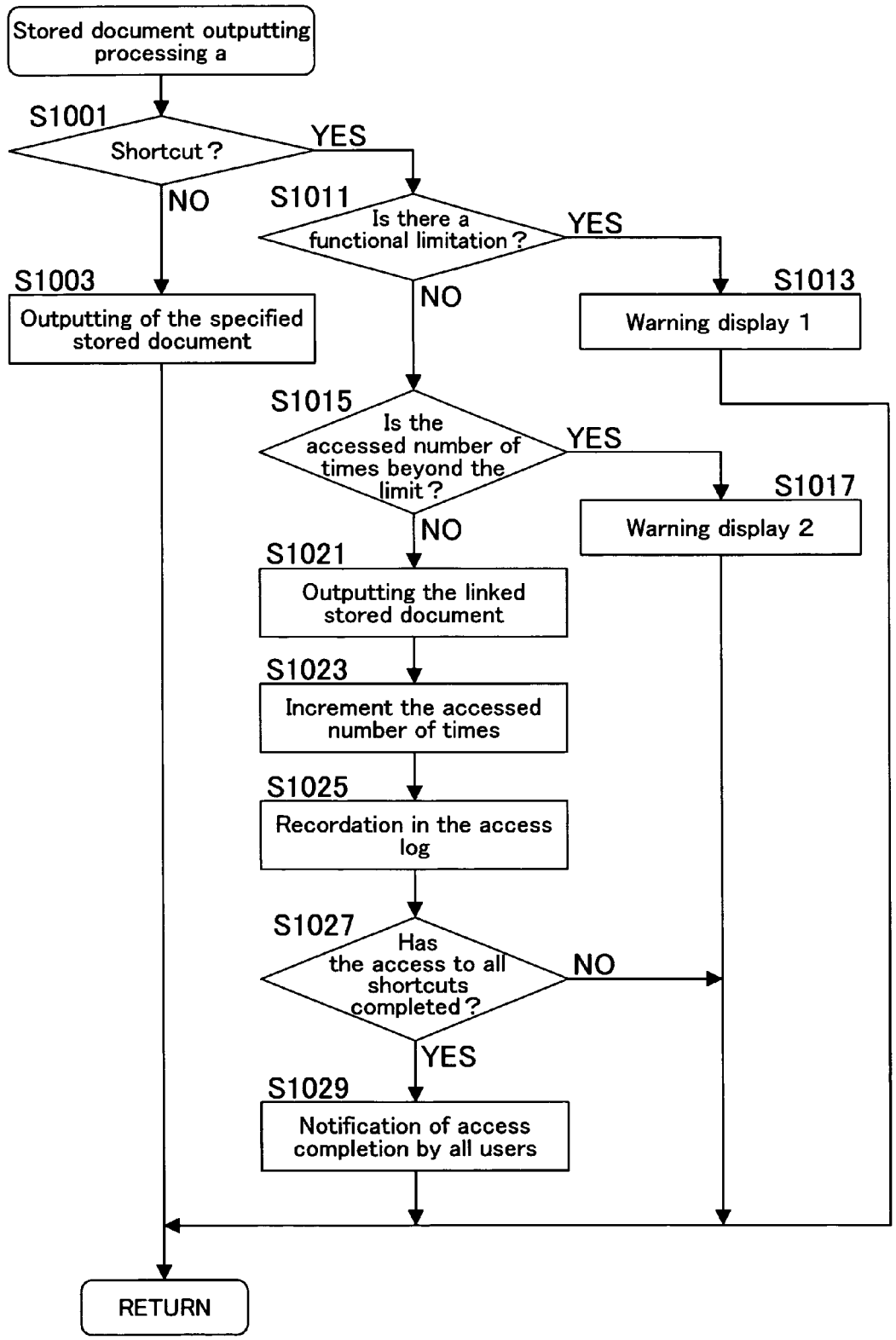
FIG. 10 is a flowchart showing stored document outputting processing (in the case of creating a shortcut in a private box) shown in the flowchart shown in FIG. 3.

[5-1] Processing for Outputting a Stored Document Via a Shortcut in a Private Box First, the processing for outputting the stored document via a shortcut in a private box will be detailed with reference to the flowchart shown in FIG. 10.

In the case of outputting a stored document, a user specifies a stored document to be outputted by operating the operation panel 130.

Initially, the CPU 101 discriminates whether the specified stored document is linked to a shortcut (S1001). If the specified stored document is not a shortcut, or the specified stored document is an original document (NO at S1001), the specified stored document is outputted (S1003) and this processing is terminated.

If the specified document is a shortcut (YES at S1001), it is discriminated whether the function to be executed is permitted to execute by referring the "function restriction" of the shortcut administration register (S1011). If the execution of the function to be executed is prohibited (YES at S1011), the warning that the execution of the specified function is prohibited is displayed on the operation panel 130 (S1013), and this processing is terminated.

As explained above, since available function to the shortcut created in a box is limited, setting the limitations every user enables appropriate document administration depending on each user.

In cases where the execution of the function to be executed is permitted (NO at S1011), it is discriminated whether the accessed number of times to the document via the shortcut has reached a predetermined number of times (S1015). The accessed number of times can be obtained by referring the shortcut administration register in which the accessed number of times is recorded. If the accessed number of times has reached a predetermined number (YES at S1015), a warning that the accessed number of times has reached the upper limit is displayed (S1017), and this processing is terminated.

As explained above, in cases where the accessed number of times to the shortcut has reached the upper limit, since an access to the shortcut is prohibited, unlimited access can be prevented, for example, in cases where the document contains highly confidential information.

If the accessed number of times has not reached a predetermined number of times (NO at S1015), the document linked by the shortcut is outputted (S1021).

Subsequently, the accessed number of times to the shortcut administration register is incremented (S1023), the access history is recorded in the access log (S1025). In the access log, 1) access date and time, 2) shortcut number, 3) accessed user name are recorded. An example of the access log is shown in FIG. 11. The accessed user name is created in the public box and recorded therein, and kept blank when the document is accessed via the shortcut created in the private box. By recording the access history as mentioned above, the administration of the sharing document can be performed assuredly.

Then, it is discriminated whether all of the shortcuts to the original document have been accessed by this access (S1027). This is performed as follows. If the accessed number of times to all of the shortcuts to the original document is larger than 0 (zero) as a result of referring the shortcut administration register, it is discriminated that all of the shortcuts to the document have been accessed.

If accesses to all of the shortcuts have not completed (NO at S1027), this processing is terminated. If accesses to all of the shortcuts have completed (YES at S1027), the completion of accesses to all of the shortcuts is notified to the destination specified as a notification destination regarding the stored document (S1029). This notification enables the user specified the sharing of the document to recognize that all of the other users have accessed to the document.

As a result of incrementing the accessed number of times, when the accessed number of times has reached a predetermined number of times, the shortcut can be automatically deleted.

As explained above, in this embodiment, the sharing users can process the sharing document within the allowed range by accessing the shortcut created to his/her own private box. As a result, despite that the sharing document is not required to be stored in each user's private box, the same effect as the effect of storing the sharing document in each private box can be secured. In addition, since the shortcut is created in the private box, there is no inconvenience that unspecified users access the sharing document.

Furthermore, it is not required to create a private box for a group sharing a document, and it is possible to cope with the member change in the group by simply creating or adding a shortcut, resulting in enhanced usability.

Furthermore, in the private box of each sharing user, only a shortcut is stored without storing a document. Therefore a large amount of the storage capacity in the private box is not occupied by the document.

Figure 12:
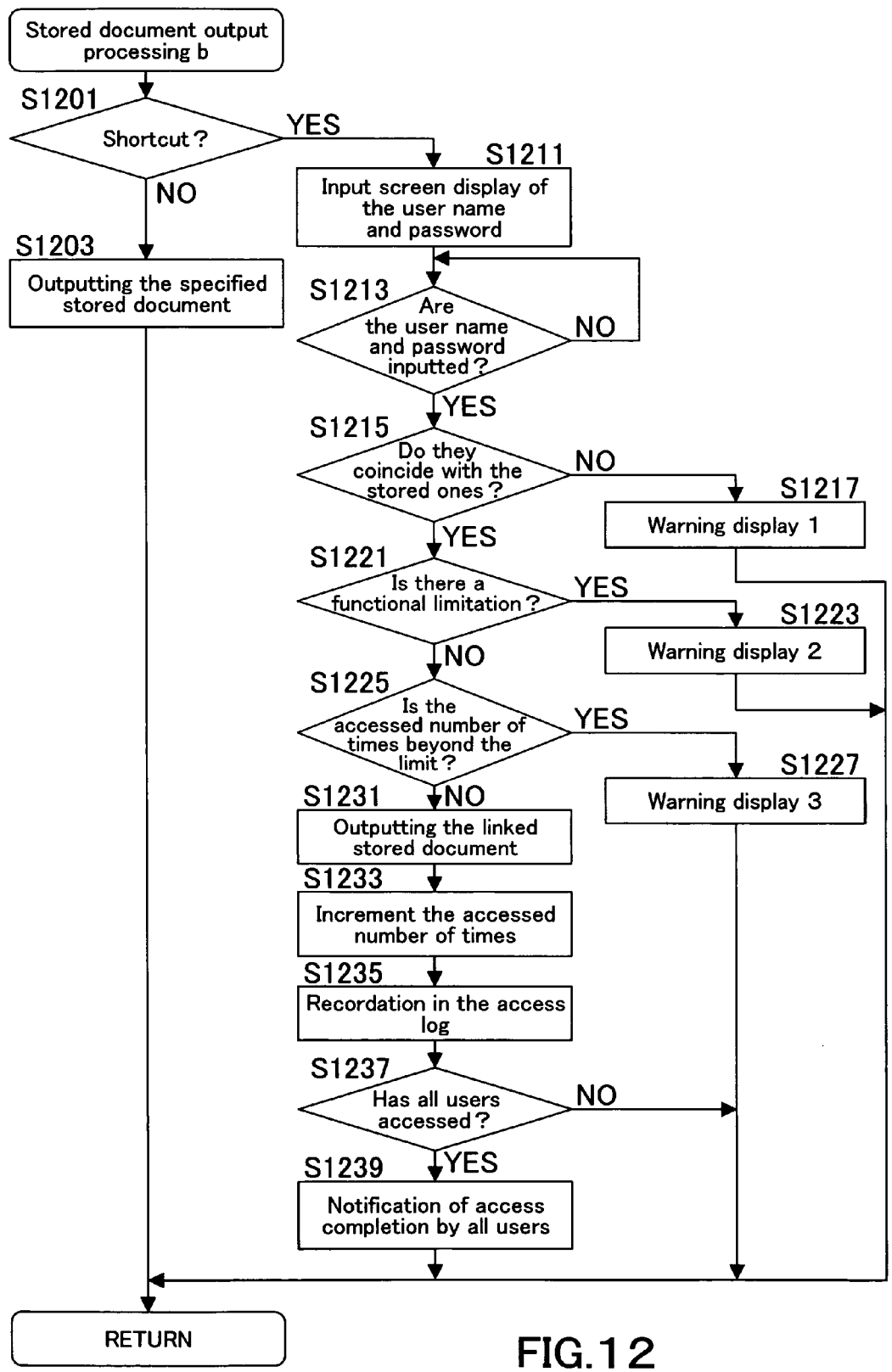
FIG. 12 is a flowchart showing stored document outputting processing (in the case of creating a shortcut in a public box) shown in the flowchart shown in FIG. 3.

[5-2] Processing for Outputting a Stored Document Via the Shortcut in the Public Box Next, the processing for outputting the stored document via a shortcut in a private box will be detailed with reference to the flowchart shown in FIG. 12.

In the case of outputting a stored document, a user specifies a stored document to be outputted by operating the operation panel 130.

Initially, the CPU 101 discriminates whether the specified stored document is a shortcut (S1201). If the specified stored document is not a shortcut, or the specified stored document is an original document (NO at S1201), the specified stored document is outputted (S1203), and this processing is terminated.

If the specified document is a shortcut (YES at S1201), the operation panel 130 displays an input screen for inviting an user to input the user name and the password (S1211), and then it is discriminated whether there is an input (S1213). If there is no input (NO at S1213), the routine waits for an input.

When the user name and the password are inputted (YES at S1213), it is discriminated whether there is a user name and a password which coincide with the inputted user name and password included in the specified shortcut (S1215). If there exists no such user name and password (NO at S1215), a warning that the access is prohibited is displayed on the operation panel 130 (S1217), and this processing is terminated.

If there exist the user name and password (YES at S1215), it is discriminated whether the function to be executed is permitted to execute by referring the "function restriction" of the shortcut administration register (S1221). If the execution of the function to be executed is prohibited (YES at S1221), the warning that the execution of the specified function is prohibited is displayed on the operation panel 130 (S1223), and this processing is terminated.

As explained above, since available function to be executed is limited every user, appropriate document administration depending on each user can be achieved.

In cases where the execution of the function to be executed is permitted (NO at S1221), it is discriminated whether the accessed number of times to the document via the shortcut has reached a predetermined number of times (S1225). The accessed number of times via the shortcut created in the public box can be obtained by referring the shortcut administration register in which the accessed number of times is recorded. If the accessed number of times has reached a predetermined number (YES at S1225), a warning that the accessed number of times has reached the upper limit is displayed (S1227), and this processing is terminated.

As explained above, in cases where the accessed number of times to the shortcut has reached the upper limit, since an access to the shortcut is prohibited, unlimited access can be prevented, for example, in cases where the document contains highly confidential information.

If the accessed number of times has not reached a predetermined number of times (NO at S1225), the document linked by the shortcut is outputted (S1231).

Subsequently, the accessed number of times to the shortcut administration register is incremented (S1233), the access history is recorded in the access log (S1235). By recording the access history as mentioned above, the administration of the sharing document can be performed assuredly.

Then, it is discriminated whether all of the users have accessed the original document (S1237). This is performed as follows. If the accessed number of times to the original document is larger than 0 (zero) as a result of referring the shortcut administration register, it is discriminated that all of the users have accessed the document. If accesses by all of the users have not completed (NO at S1237), this processing is terminated. If accesses by all of the users have completed (YES at S1237), the completion of accesses by all of the users is notified to the destination specified as a notification destination regarding the stored document (S1239). This notification enables the user specified the sharing of the document to recognize that all of the other users have accessed the document.

As explained above, in this embodiment, the sharing users can process the sharing document within the allowed range by accessing the shortcut created in a public box. As a result, even if no sharing document is stored in each user's private box, or even if the user has no private box, the document can be shared. Furthermore, since the user authentication is performed based on the user identification information inputted and the user identification information written in the shortcut, even if an unidentified user can access the shortcut, an unidentified user cannot access the sharing document. This enables document sharing while keeping the security.

Furthermore, it is not required to create a private box for a group sharing a document, and it is possible to cope with the member change in the group by simply re-creating a shortcut, resulting in enhanced usability.

Furthermore, it is not required to store a document in a private box of each sharing user, and it is not required to create a shortcut in each private box. Creating only one shortcut to a public box is enough. Therefore, document sharing can be achieved without requiring a large amount of the storage capacity of the box.

[6] Checking of Shortcut Expiration Date

Figure 13:
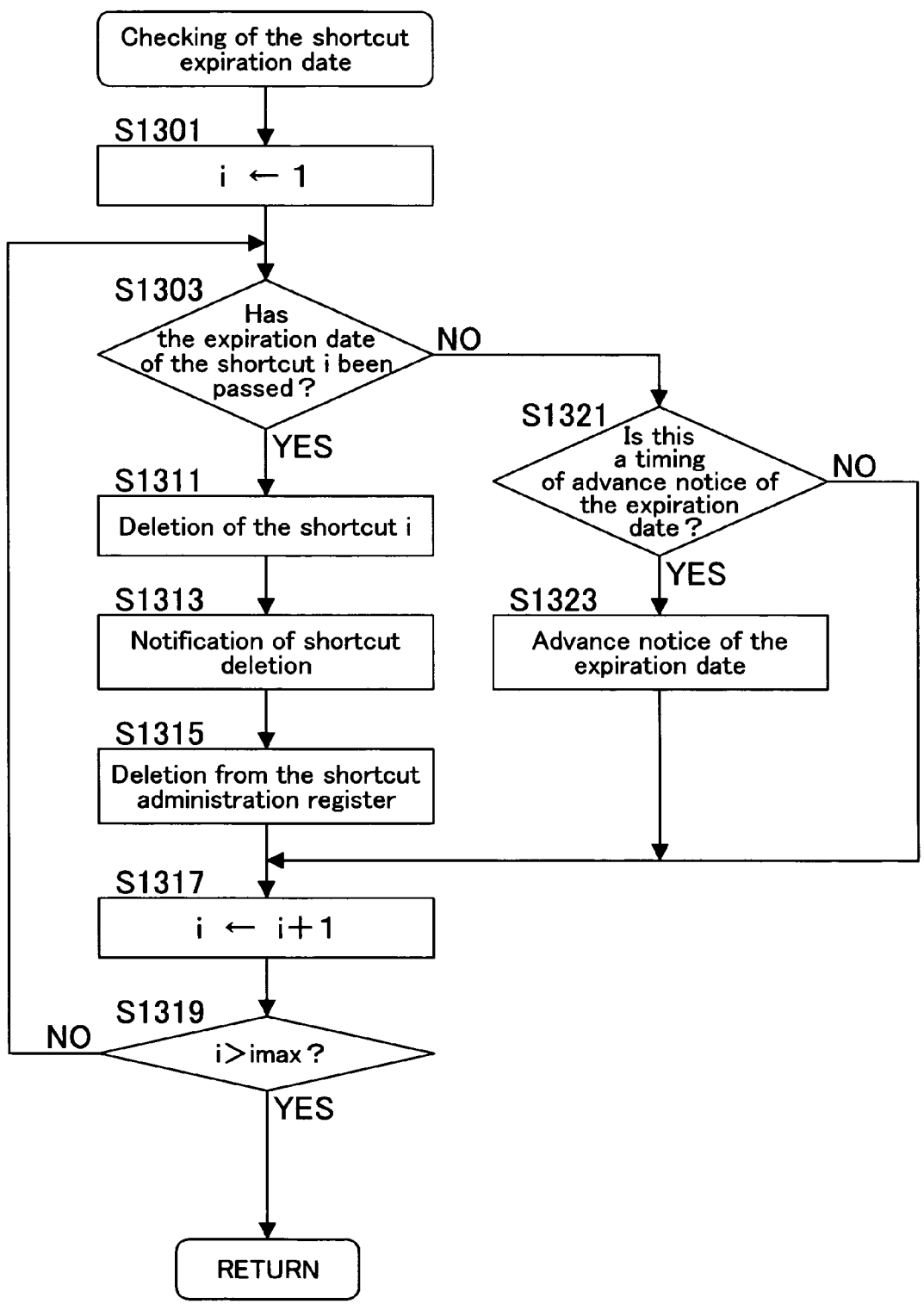
FIG. 13 is a flowchart showing expiration day checking processing shown in the flowchart shown in FIG. 3.

Lastly, S307 shown in FIG. 3, i.e., checking of shortcut expiration date, will be detailed with reference to the flowchart shown in FIG. 13.

As explained above, when a shortcut is created in a private box or a public box, the creating date and time will be recorded in the shortcut administration register. The CPU 101 of the image forming apparatus 1 refers the shortcut administration register and executes the following processing on the shortcut registered in the shortcut administration register.

Initially, by comparing the current date and time by the clock IC 105 with the creation date and time of the shortcut i, it is discriminated whether the first effective expiration time since the creation of the shortcut has passed (S1303). If the first effective expiration time has passed (YES at S1303), the shortcut i is deleted (S1311). This prevents a document containing highly confidential information from being remained in a sharing status. In addition, occupancy by the unused shortcut in the storage capacity can also be prevented.

The completion of deletion of the shortcut is notified to a destination regarding the shortcut registered in the shortcut administration register (S1313). If the shortcut i is a shortcut of a public box, the completion of deletion of the shortcut will be notified to all of the sharing users or groups. This enables the sharing users or groups to recognize the deletion of the shortcut.

Lastly, all of the information of the shortcut deleted from the shortcut administration register is deleted (S1315). If the deleted shortcut is a shortcut created in the public box, the information of all of the users is deleted.

On the other hand, in cases where the first effective expiration time since the creation of the shortcut i has not passed (NO at S1303), it is discriminated whether the second effective expiration time since the creation of the shortcut i has passed (S1321). Please note that the second effective expiration time is set to be shorter than the first effective expiration time so that the expiration can be recognized in advance.

If the second effective time since the creation of the shortcut i has not passed (NO at S1321), the routine proceeds to S1317. To the contrary, if the second effective time since the creation of the shortcut i has passed (YES at S1321), the impending expiration time of the shortcut is notified to a destination regarding the shortcut registered in the shortcut administration register (S1323). In cases where the shortcut i is a shortcut of a public box, the impending time is notified to destinations of all of the sharing users or groups. This enables them to recognize that the expiration time of the shortcut is impending.

Although an embodiment of the present invention is explained above, it should be noted that the present invention is not limited to it.

For example, in the above embodiment, a request of storing and sharing a document, and a request of selecting the sharing document from the stored documents and sharing the document are made from the terminal apparatus 2, and the CPU 101 receives these requests via the network I/F 160 and processes them. However, the requests can be made by using the operation panel 130, and the CPU 101 can receive the requests transmitted from the operation panel 160 and process.

Furthermore, in the above embodiment, an output request of the sharing document stored in a box and a request of deleting a shortcut are inputted from the operation panel 130. However, these requests can be inputted from outside such as a terminal apparatus 2.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A document administration apparatus, comprising:
   a memory;
   a sharing request receiving portion configured to receive a request of sharing a document stored in a first box comprising a private box allowing an access only by a specific user or user group among a plurality of boxes which are divided storing areas in a fixed storage device;
   a box information receiving portion configured to receive box information on one or more second boxes each correlated with each user sharing the document to which the sharing request is made;
   a shortcut creating portion configured to create a shortcut in all of the second boxes represented by the box information received by the box information receiving portion, the shortcut including link information to the document stored in the first box; and
   a link portion configured to process an access to the shortcut created by the shortcut creating portion by replacing the access with an access to the document which is a linked destination written in the shortcut.

2. The document administration apparatus as recited in claim 1, further comprising a shortcut creation notifying portion for notifying destinations correlated with each of the second boxes that the shortcut is created by the shortcut creating portion when the shortcut is created by the shortcut creating portion.

3. The document administration apparatus as recited in claim 1, further comprising:
   a timer portion for timing an elapsed time after creation of the shortcut by the shortcut creating portion; and
   a first shortcut deleting portion for deleting the shortcut that the elapsed time timed by the timer portion has reached a prescribed time.

4. The document administration apparatus as recited in claim 1, further comprising:
   a sharing document deleting portion for deleting the sharing document stored in the first box; and
   a second shortcut deleting portion for deleting all of the shortcuts including link information to the sharing document in association with the deletion of the sharing document by the sharing document deleting portion.

5. The document administration apparatus as recited in claim 1, further comprising:
   an access number counting portion for counting an access number of times to the shortcut created by the shortcut creating portion; and
   an access number limiting portion for prohibiting an access to the shortcut that an access number of times has reached a prescribed number of times counted by the access number counting portion.

6. The document administration apparatus as recited in claim 1, further comprising:
   a function setting portion for setting a function executable to each shortcut created in the second box; and a function limiting portion for allowing a function executable to the shortcut only within a range set by the function setting portion.

7. The document administration apparatus as recited in claim 1, further comprising an access history recording portion for recording an access history to the shortcut created by the shortcut creating portion.

8. The document administration apparatus as recited in claim 1, further comprising an access completion notifying portion for notifying destinations correlated with the first box that all of the shortcuts including link information to the sharing document have been accessed when all of the shortcuts including link information to the sharing document have been accessed.

9. The document administration apparatus of claim 1, wherein at least one of said second boxes is a private box wherein access to stored documents is limited to a specific user or group.

10. The document administration apparatus of claim 9, wherein said shortcut creating portion creates a shortcut stored in each private box of each user in said group.

11. The document administration apparatus of claim 1, wherein at least one of said second boxes is a public box with no access limitation to stored documents.

12. The document administration apparatus of claim 11, wherein said shortcut creating portion creates a single shortcut to the public box.

13. A document administration apparatus, comprising:
a memory;
a sharing request receiving portion configured to receive a request of sharing a document stored in a first box among a plurality of boxes which are divided storing areas in a fixed storage device;
a box information receiving portion configured to receive box information on a second box used to share a document to which the sharing request is made;
a sharing user information receiving portion configured to receive identification information of one or more users sharing the document stored in the first box;
a shortcut creating portion configured to create a shortcut to the second box represented by the box information received by the box information receiving portion, the shortcut including link information to the document stored in the first box and the user identification information;
a user authentication portion configured to judge whether an access to the shortcut is allowed by discriminating whether user identification information inputted coincides with any user identification information written in the shortcut when the user accesses the shortcut created by the shortcut creating portion; and
a link portion configured to process an access to the shortcut by replacing the access with an access to the document which is a linked destination written in the shortcut only when the access is allowed by the user authentication portion.

14. The document administration apparatus as recited in claim 13, wherein the user identification information is a user name and a password.

15. The document administration apparatus as recited in claim 13, further comprising a shortcut creation notifying portion for notifying destinations correlated with each user identification information written in the shortcut when the shortcut is created by the shortcut creating portion.

16. The document administration apparatus as recited in claim 13, further comprising:

a timer portion for timing an elapsed time after creation of the shortcut by the shortcut creating portion; and
a first shortcut deleting portion for deleting the shortcut that the elapsed time timed by the timer portion has reached a prescribed time.

17. The document administration apparatus as recited in claim 13, further comprising: a sharing document deleting portion for deleting the sharing document stored in the first box; and
a second shortcut deleting portion for deleting all of the shortcuts including link information to the sharing document in association with the deletion of the sharing document by the sharing document deleting portion.

18. The document administration apparatus as recited in claim 13, further comprising:
an access number counting portion for counting an access number of times to the shortcut created by the shortcut creating portion per the user identification information; and
an access number limiting portion for prohibiting an access to the shortcut by a user of the user identification information that an access number of times has reached a prescribed number of times counted by the access number counting portion.

19. The document administration apparatus as recited in claim 13, further comprising:
a function setting portion for setting a function executable to each of the user identification information; and
a function limiting portion for allowing a function executable to the shortcut every user identification information only within a range set by the function setting portion.

20. The document administration apparatus as recited in claim 13, further comprising an access history recording portion for recording an access history to the shortcut created by the shortcut creating portion every user identification information.

21. The document administration apparatus as recited in claim 13, further comprising an access completion notifying portion for notifying destinations correlated with the first box that the shortcut including link information to the sharing document have been accessed by all of the users represented by the user identification information when the shortcut including link information to the sharing document have been accessed by all of the users represented by the user identification information.

22. A recording medium in which document administration program is stored, wherein the document administration program makes a computer execute the steps of:
receiving a request of sharing a document stored in a first box comprising a private box allowing an access only b a specific user or user group among boxes which are divided storing areas;
receiving box information on one or more second boxes each correlated with each user sharing the document to which the sharing request is made;
creating a shortcut in all of the second boxes represented by the box information received, the shortcut including link information to the document stored in the first box; and
processing an access to the created shortcut by replacing the access with an access to the document which is a linked destination written in the shortcut.

23. A recording medium in which document administration program is stored, wherein the document administration program makes a computer execute the steps of: receiving a request of sharing a document stored in a first box among boxes which are divided storing areas;

receiving box information on one or more second boxes used to share a document to which the sharing request is made;

receiving identification information of one or more users sharing the document stored in the first box; creating a shortcut to the second boxes represented by the box information received, the shortcut including link information to the document stored in the first box and the user identification information;

judging whether an access to the shortcut is allowed by discriminating whether user identification information inputted coincides with any user identification information written in the shortcut when the user accesses the shortcut created; and processing an access to the shortcut by replacing the access with an access to the document which is a linked destination written in the shortcut only when the access is allowed at the judging step.

* * * * *